(12) United States Patent
Woelfert et al.

(10) Patent No.: US 7,659,430 B2
(45) Date of Patent: Feb. 9, 2010

(54) METHOD FOR SEPARATING HYDROGEN CHLORIDE AND PHOSGENE

(75) Inventors: Andreas Woelfert, Bad Rappenau (DE); Carsten Knoesche, Niederkirchen (DE); Hans-Juergen Pallasch, Ludwigshafen (DE); Martin Sesing, Waldsee (DE); Eckhard Stroefer, Mannheim (DE); Hans-Martin Polka, Mannheim (DE); Manfred Heilig, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/574,263

(22) PCT Filed: Sep. 10, 2005

(86) PCT No.: PCT/EP2005/009762

§ 371 (c)(1),
(2), (4) Date: Feb. 26, 2007

(87) PCT Pub. No.: WO2006/029788

PCT Pub. Date: Mar. 23, 2006

(65) Prior Publication Data

US 2007/0293707 A1 Dec. 20, 2007

(30) Foreign Application Priority Data

Sep. 13, 2004 (DE) .................. 10 2004 044 592

(51) Int. Cl.
*C07C 45/00* (2006.01)
*C07C 49/00* (2006.01)
*B01D 47/00* (2006.01)

(52) U.S. Cl. ........................... 568/383; 568/419; 96/38; 96/233

(58) Field of Classification Search .................. 210/767; 568/383, 419; 95/38, 233
See application file for complete search history.

(56) References Cited

U.S. PATENT DOCUMENTS

| | | | |
|---|---|---|---|
| 3,142,535 A | 7/1964 | Christoph et al. | |
| 4,200,763 A * | 4/1980 | Dai | 560/109 |
| 4,238,465 A * | 12/1980 | Chun | 423/240 R |
| 4,251,457 A * | 2/1981 | Kondratenko et al. | 562/856 |
| 4,254,092 A | 3/1981 | Coenen et al. | |
| 7,351,339 B2 * | 4/2008 | Maase et al. | 210/638 |
| 2002/0189444 A1 * | 12/2002 | Brennecke et al. | 95/45 |

(Continued)

FOREIGN PATENT DOCUMENTS

DE 1 107 218 5/1961

(Continued)

OTHER PUBLICATIONS

Campbell J.Am.ChemSoc 1995 117,7791-7800.*

(Continued)

*Primary Examiner*—Porfirio Nazario Gonzalez
(74) *Attorney, Agent, or Firm*—Oblon, Spivak, McClelland, Maier & Neustadt, L.L.P.

(57) ABSTRACT

The invention relates to a process for separating hydrogen chloride and phosgene, which comprises bringing a mixture of hydrogen chloride and phosgene into contact with an ionic liquid in which at least part of the hydrogen chloride is dissolved in a step a) and then separating off the hydrogen chloride dissolved in the ionic liquid in a step b).

19 Claims, 2 Drawing Sheets

U.S. PATENT DOCUMENTS

Figure 1:
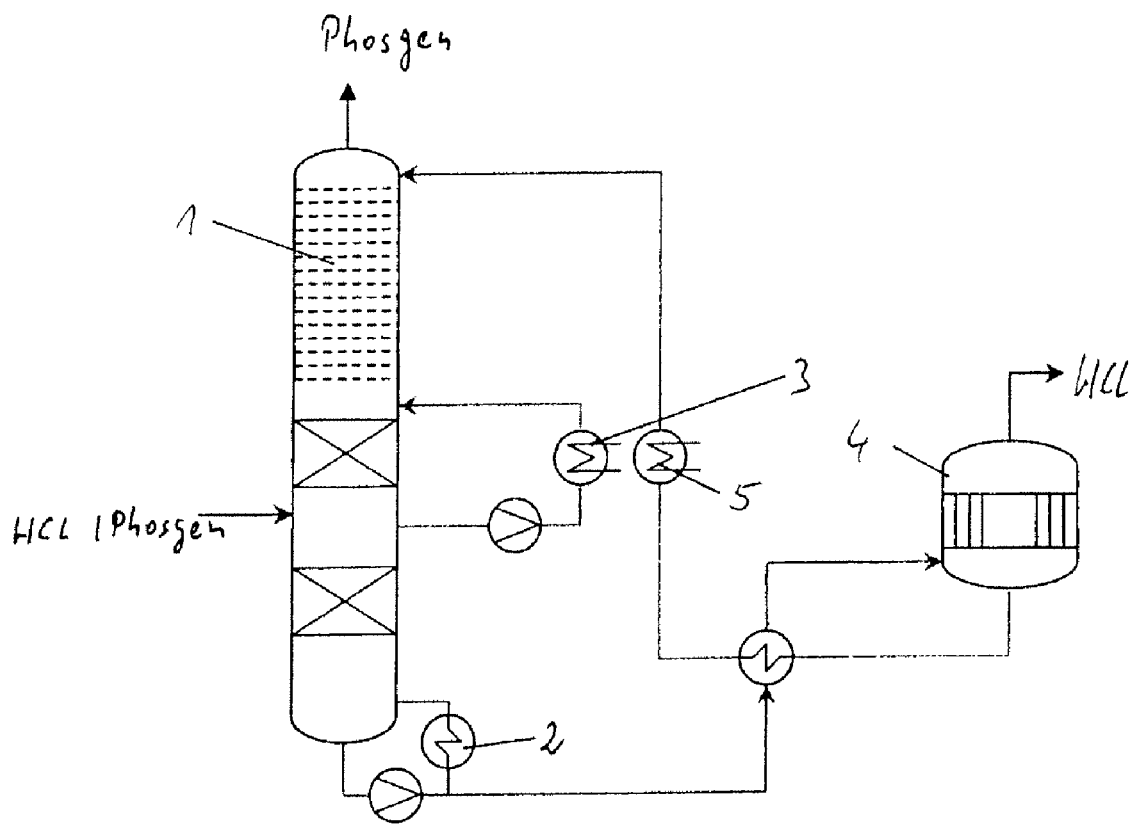

| | | |
|---|---|---|
| 2004/0022720 A1* | 2/2004 | Low et al. .................... 423/488 |
| 2004/0077519 A1* | 4/2004 | Price et al. .................. 510/499 |
| 2004/0206241 A1* | 10/2004 | Tempel et al. ................. 96/155 |
| 2005/0020857 A1* | 1/2005 | Volland et al. ................ 564/12 |
| 2005/0129598 A1* | 6/2005 | Chinn et al. ................ 423/226 |
| 2006/0123842 A1* | 6/2006 | Sohn et al. .................... 62/617 |

FOREIGN PATENT DOCUMENTS

| | | |
|---|---|---|
| DE | 886 893 | 8/1963 |
| DE | 1 203 741 | 10/1965 |
| DE | 1 593 412 | 8/1970 |
| DE | 21 43 994 | 3/1973 |
| DE | 31 39 705 | 4/1983 |
| EP | 0 531 836 | 9/1993 |
| EP | 0 684 067 | 11/1995 |
| GB | 737 442 | 9/1955 |
| JP | 9 208589 | 8/1997 |
| RO | 63844 | 3/1978 |
| SU | 18 11 161 | 5/1995 |
| WO | 99 11597 | 3/1999 |
| WO | 02 44117 | 6/2002 |
| WO | 2004 056758 | 7/2004 |
| WO | WO 2004056758 A1 * | 7/2004 |

OTHER PUBLICATIONS

K. R. Seddon, Nature Materials, vol. 2, No. 6, pp. 363-365 (2003).*

* cited by examiner

METHOD FOR SEPARATING HYDROGEN CHLORIDE AND PHOSGENE

Mixtures of hydrogen chloride and phosgene are obtained in many processes practiced on a large industrial scale, for example in the preparation of isocyanates, acid chlorides and polycarbonates, and these have to be separated into their constituents. A number of processes are known for achieving this.

DE 2143994 describes the removal of phosgene from gaseous hydrogen chloride by compression and partial condensation of hydrogen chloride. A disadvantage is the use of a gas compressor with its high costs and maintenance requirement.

GB 737442 describes the recovery of phosgene from a hydrogen chloride/phosgene stream by condensation in a shell-and-tube condenser. A disadvantage is the low condensation temperature of from −40 to −60° C. This requires the use of an expensive refrigeration plant.

DE1107218 describes the removal of phosgene from a hydrogen chloride/phosgene mixture by scrubbing with ethylene dichloride. A disadvantage of the scrubbing process is that the organic scrubbing medium ethylene chloride is present in the hydrogen chloride stream after scrubbing.

SU 1811161 describes the separation of hydrogen chloride and phosgene by absorption in the solvent chlorobenzene. A disadvantage of the scrubbing process in this case, too, is that the chlorobenzene is present in the hydrogen chloride stream after scrubbing.

RO 63844 describes the removal of phosgene from a hydrogen chloride/phosgene mixture by scrubbing. ortho-Dichlorobenzene, inter alia, is used as scrubbing medium. A disadvantage of this scrubbing process, too, is that the organic scrubbing medium is present in the hydrogen chloride stream after scrubbing.

DE 1593412 describes the separation of hydrogen chloride and phosgene by distillation. The hydrogen chloride obtained is very clean, so that it is suitable, for example, for food applications. A disadvantage of the separation by distillation is that it has to be carried out at a relatively high pressure, since the hydrogen chloride obtained overhead in the distillation has to be condensed by means of a refrigeration medium in heat exchangers. Since an extremely expensive low-temperature refrigeration plant does not have to be used for producing the refrigeration medium, the distillation is carried out under superatmospheric pressure. A disadvantage is the increased safety precautions required for safe handling of the phosgene under superatmospheric pressure.

WO 99/11597 describes the separation of hydrogen chloride and phosgene under superatmospheric pressure in a column installed downstream of a reactor for the preparation of chloroformate. The reactor is operated at pressures of from 2 to 60 bar, preferably from 6 to 40 bar. High pressures are recognized as advantageous for separating phosgene and hydrogen chloride, since the condensers then do not have to be operated at low temperatures. A disadvantage is the increased safety precautions required for safe handling of the phosgene under superatmospheric pressure.

WO 04/056758 describes a process for fractionating a mixture comprising hydrogen chloride and phosgene, in which a partial or complete condensation of phosgene is firstly carried out, followed by a distillation or stripping step in a column to remove the hydrogen chloride from the bottom product phosgene and subsequently a scrub of the overhead product hydrogen chloride by means of the process solvent so as to absorb the phosgene in the process solvent. A disadvantage of the process is that the hydrogen chloride obtained still contains traces of the process solvent which have to be removed by, for example, adsorption on a bed of activated carbon.

Furthermore, the reactive purification of hydrogen chloride has also been described, for example, in U.S. Pat. No. 3,142,535, EP 531836 or DE 1203741. Disadvantages are the stoichiometric consumption of the reaction solution and the destruction of the component which is removed, so that this cannot be reused.

In JP 09208589, an alkali metal compound or alkaline earth metal compound, preferably a weakly acidic salt or oxide such as calcium oxide, is used for removing the hydrogen chloride formed in the reaction. A disadvantage is that the hydrogen chloride is consumed and cannot be used further.

It was therefore an object of the invention to provide a process for separating hydrogen chloride and phosgene in a phosgene/hydrogen chloride mixture, which operates at moderate pressures which allow simple and safe handling of the phosgene and operates at temperatures at which it is possible to make do without expensive low-temperature refrigeration plants. The hydrogen chloride and phosgene streams obtained should have a high purity.

It has surprisingly been found that this object can be achieved by means of a scrub using an ionic liquid.

The invention accordingly provides a process for separating hydrogen chloride and phosgene, which comprises bringing a mixture of hydrogen chloride and phosgene into contact with an ionic liquid in which at least part of the hydrogen chloride is dissolved in a step a) and then separating off the hydrogen chloride dissolved in the ionic liquid in a step b).

The hydrogen chloride/phosgene mixture is, as indicated, brought into contact with the ionic liquid in a first scrubbing step a).

Here, a gas phase which is free of hydrogen chloride or depleted in hydrogen chloride, i.e. it contains less hydrogen chloride than the starting mixture, is formed. The resulting scrubbing medium phase contains proportionately more hydrogen chloride than the starting mixture. In a second process step, the purified hydrogen chloride is driven off from the ionic liquid.

After the hydrogen chloride has been driven off, the scrubbing medium can be reused for separating the hydrogen chloride/phosgene mixture.

To achieve the required purities of the hydrogen chloride and the phosgene, it can be advantageous to carry out scrubbing in a multistage apparatus in combination with an evaporator. To reduce the scrubbing medium stream required, it is possible to effect intermediate cooling of the ionic liquid to increase its uptake capacity.

In addition, it can be advantageous to repeat the scrubbing step mentioned a number of times using different ionic liquids. In this case, both the phosgene stream and the hydrogen chloride stream can be subjected to further scrubbing. The process can be carried out continuously or batchwise. Preference is given to carrying out the process continuously.

The contact between the hydrogen chloride/phosgene mixture and the ionic liquid in order to dissolve the hydrogen chloride in the first step of the process of the invention can be established in all customary gas-liquid contact apparatuses. These include vessels, pump circuits comprising at least a pump and a gas inlet nozzle, surface absorbers, falling film absorbers, columns, bubble columns, stirred vessels with gas inlets, spray columns, jet nozzle scrubbers.

Preference is given to columns having internals. Internals which can be used are ordered packing, trays and/or random packing. The hydrogen chloride/phosgene mixture can be introduced between the top and bottom of the column or into the bottom of the column. The hydrogen chloride/phosgene mixture is preferably introduced between the top and bottom of the column.

In a preferred embodiment, a liquid stream is taken off from the column at a side offtake, cooled by means of a heat exchanger and fed back into the column at a point at or above the offtake level.

In a further, preferred embodiment, the bottom of the column is provided with a vaporizer stage. Possible vaporizers are all customary types of vaporizer, e.g. falling film evaporators, helical tubes, thin film evaporators, natural convection evaporators with external or internal circulation, for example a Robert evaporator, or forced circulation evaporators. The falling film evaporator can be operated in a single pass or with circulation by means of a pump.

The contact between the gas phase and the liquid phase can be carried out in one or more thermodynamic stages, preferably in from 1 to 100 stages. The contact is preferably carried out in a plurality of thermodynamic stages, in particular in from 2 to 60 stages.

The hydrogen chloride dissolved in the solvent is driven off in at least one theoretical thermodynamic stage at at least one working pressure. The hydrogen chloride is preferably driven off in apparatuses having one thermodynamic separation stage.

Possible apparatuses for driving off the hydrogen chloride are falling film evaporators, helical tubes, thin film evaporators, natural convection evaporators with external or internal circulation, for example Robert evaporators, columns with internals which may be heated, forced circulation evaporators or falling film evaporators. Preference is given to using a Robert evaporator or a falling film evaporator. The falling film evaporator can be operated in a single pass or with circulation by means of a pump.

The apparatuses used in the process can be made of all materials customary in process engineering. Preference is given to apparatuses made of steel, enamels, glass or fiber-reinforced plastics or combinations thereof.

The ionic liquids used for the process of the invention are selected so that the solubility of the substance to be absorbed is very much greater than that of the substance which is not to be absorbed, so that by changing the pressure and/or temperature the absorbed substance can be separated reversibly from the ionic liquid, so that when acids are absorbed in the ionic liquid, the anion of the acid is preferably used for forming the ionic liquid, and so that, in the case of absorbing of acids, the volatility of the corresponding acid of the anion of the ionic liquid is lower than that of the acid to be absorbed.

For the purposes of the present invention, ionic liquids are compounds comprising a cation and an anion, with at least one of the ions, in particular at least the cation, being organic.

The cations are preferably selected from the group consisting of 1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimida-zolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2,3-dimethylimidazolium, 1-tetradecyl-3-methylimidazolium, 2,3-dimethylimidazolium, 2-ethyl-3,4-dimethylimidazolium, 3,4-dimethylimidazolium, 1,2-dimethylpyridinium, 1-butyl-2-ethyl-6-methylpyridinium, 1-butyl-2-ethylpyridinium, 1-butyl-2-methylpyridinium, 1-butyl-3,4-dimethylpyridinium, 1-butyl-3,5-dimethylpyridinium, 1-butyl-3-ethylpyridinium, 1-butyl-3-methylpyridinium, 1-butyl-4-methylpyridinium, 1-butylpyridinium, 1-ethylpyridinium, 1-hexyl-3-methylpyridinium, 1-hexyl-4-methylpyridinium, 1-hexylpyridinium, 1-methylpyridinium, 1-octylpyridinium, 2-ethyl-1,6-dimethylpyridinium, 2-ethyl-1-methylpyridinium, 4-methyl-1-octylpyridinium, 1,1-dimethylpyrrolidinium, 1-butyl-1-ethylpyrrolidinium, 1-butyl-1-methylpyrrolidinium, 1-ethyl-1-methylpyrrolidinium, 1-ethyl-3-methylpyrrolidinium, 1-hexyl-1-methylpyrrolidinium, 1-octyl-1-methylpyrrolidinium, guanidinium, hexamethylguanidinium, N,N,N',N'-tetramethyl-N"-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium, triisobutyl(methyl)phosphonium, butyltrimethylammonium, methyltrioctylammonium, octyltrimethylammonium, tetrabutylammonium, tetraethylammonium, tetramethylammonium, tributylmethylammonium and guanidinium ions of the general formula (I)

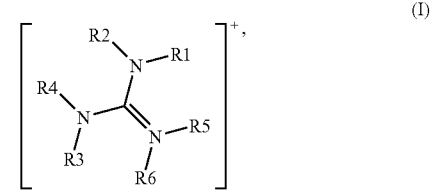

where the radicals R1 to R6 are each, independently of one another, hydrogen, C1-C18-alkyl, C2-C18-alkyl which may be interrupted by one or more oxygen and/or sulfur atoms and/or one or more substituted or unsubstituted imino groups, C6-C12-aryl, C5-C12-cycloalkyl or a five- or six-membered, oxygen-, nitrogen- and/or sulfur-containing heterocycle or two of them can together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

The cations are particularly preferably selected from the group consisting of 1,2,3-trimethylimidazolium, 1,2-dimethylimidazolium, 1,3,4-trimethylimidazolium, 1,3-dibutylimidazolium, 1,3-diethylimidazolium, 1,3-dimethylimidazolium, 1-butyl-2,3-dimethylimidazolium, 1-butyl-2-methylimidazolium, 1-butyl-3-ethylimidazolium, 1-butyl-3-methylimidazolium, 1-butylimidazolium, 1-ethyl-2,3-dimethylimidazolium, 1-ethyl-3-methylimidazolium, 1-hexyl-3-methylimidazolium, 1-methyl-2-ethylimidazolium, 1-methyl-3-octylimidazolium, 1-methylimidazolium, 1,2-dimethylpyridinium, 1-butyl-2-methylpyridinium, 1-butyl-3-ethylpyridinium, 1-butyl-3-methylpyridinium, 1-butyl-4-methylpyridinium, 1-butylpyridinium, 1-ethylpyridinium, 1-hexylpyridinium, 1-methylpyridinium, 2-ethyl-1-methylpyridinium, 1,1-dimethylpyrrolidinium, 1-butyl-1-ethylpyrrolidinium, 1-butyl-1-methylpyrrolidinium, 1-ethyl-1-methylpyrrolidinium, guanidinium, hexamethylguanidinium, benzyltriphenylphosphonium, tetrabutylphosphonium, butyltrimethylammonium, methyltrioctylammonium, tetrabutylammonium, tributylmethylammonium.

In particular, the cations are selected from the group consisting of 1,2,3-trimethylimidazolium, 1,2-dimethylimidazolium, 1,3-dimethylimidazolium, 1-butyl-2-methylimidazolium, 1-butyl-3-ethylimidazolium, 1-butyl-3-methylimidazolium, 1-butylimidazolium, 1-ethyl-3-methylimidazolium, 1-methylimidazolium, 1-butyl-4-methylpyridinium, 1-butylpyridinium, 1-ethylpyridinium, 1-methylpyridinium, guanidinium, hexamethylguanidinium, methyltrioctylammonium and tributylmethylammonium.

The anions are preferably selected from the group consisting of acetate, bis(2,4,4-trimethylpentyl)phosphinate, bis(malonato)borate, bis(oxalato)borate, bis(pentafluoroethyl)phosphinate, bis(phthalato)borate, bis(salicylato)borate, bis(trifluoromethanesulfonyl)imidate, bis(trifluoromethanesulfonyl)methane, bis(trifluoromethyl)imidate, bromide, bromoaluminates, carbonate, chloride, chloroaluminates, dichlorocuprate, dicyanamide, diethylphosphate, dihydrogenphosphate, ethylsulfate, ethylsulfonate, fluoride, hexafluorophosphate, hydrogencarbonate, hydrogenphosphate, hydrogensulfate, hydrogensulfite, iodide, methylsulfate, methylsulfonate, nitrate, nitrite, phosphate, sulfate, sulfite, tetracyanoborate, tetrafluoroborate, tetrakis(hsulfato)borate, tetrakis(methylsulfonato)borate, thiocyanate, tosylate, trichlorozincate, trifluoroacetate, trifluoromethylsulfonate, tris(heptafluoropropyl)trifluorophosphate, tris(nonafluorobutyl)trifluorophosphate, tris(pentafluoroethyl)trifluorophosphate and tris(pentafluoroethylsulfonyl)trifluorophosphate.

The anions are particularly preferably selected from the group consisting of acetate, bis(trifluoromethanesulfonyl)imidate, bis(trifluoromethanesulfonyl)methane, bis(trifluoromethyl)imidate, bromide, chloride, ethylsulfonate, hexafluorophosphate, hydrogenphosphate, hydrogensulfate, methylsulfonate, sulfate, tetrafluoroborate, tetrakis(hydrogensulfato)borate, thiocyanate, tosylate, trifluoroacetate and trifluoromethylsulfonate.

In particular, the anions are selected from the group consisting of bis(trifluoromethanesulfonyl)imidate, chloride, hydrogensulfate, methylsulfonate, tosylate and trifluoromethylsulfonate.

In a particularly preferred embodiment of the invention, an ionic liquid having chloride, hydrogensulfate and methylsulfonate as anions is used. Very particular preference is given to using an ionic liquid having the chloride ion as anion.

Ionic liquids are preferably selected from the group consisting of 1,2,3-trimethylimidazolium bis(trifluoromethanesulfonyl)imidate, 1,2-dimethylimidazolium bis(trifluoromethanesulfonyl)imidate, 1,3-dimethylimidazolium bis(trifluoromethanesulfonyl)imidate, 1-butyl-2-methylimidazolium bis(trifluoromethanesulfonyl)imidate, 1-butyl-3-ethylimidazolium bis(trifluoromethanesulfonyl)imidate, 1-butyl-3-methylimidazolium bis(trifluoromethanesulfonyl)imidate, 1-butylimidazolium bis(trifluoromethanesulfonyl)imidate, 1-ethyl-3-methylimidazolium bis(trifluoromethanesulfonyl)imidate, 1-methylimidazolium bis(trifluoromethanesulfonyl)imidate, 1-butyl-4-methylpyridinium bis(trifluoromethanesulfonyl)imidate, 1-butylpyridinium bis(trifluoromethanesulfonyl)imidate, 1-ethylpyridinium bis(trifluoromethanesulfonyl)imidate, 1-methylpyridinium bis(trifluoromethanesulfonyl)imidate, guanidinium bis(trifluoromethanesulfonyl)imidate, hexamethylguanidinium bis(trifluoromethanesulfonyl)imidate, methyltrioctylammonium bis(trifluoromethanesulfonyl)imidate, tributylmethylammonium bis(trifluoromethanesulfonyl)imidate, 1,2,3-trimethylimidazolium chloride, 1,2-dimethylimidazolium chloride, 1,3-dimethylimidazolium chloride, 1-butyl-2-methylimidazolium chloride, 1-butyl-3-ethylimidazolium chloride, 1-butyl-3-methylimidazolium chloride, 1-butylimidazolium chloride, 1-ethyl-3-methylimidazolium chloride, 1-methylimidazolium chloride, 1-butyl-4-methylpyridinium chloride, 1-butylpyridinium chloride, 1-ethylpyridinium chloride, 1-methylpyridinium chloride, guanidinium chloride, hexamethylguanidinium chloride, methyltrioctylammonium chloride, tributylmethylammonium chloride, 1,2,3-trimethylimidazolium hydrogensulfate, 1,2-dimethylimidazolium hydrogensulfate, 1,3-dimethylimidazolium hydrogensulfate, 1-butyl-2-methylimidazolium hydrogensulfate, 1-butyl-3-ethylimidazolium hydrogensulfate, 1-butyl-3-methylimidazolium hydrogensulfate, 1-butylimidazolium hydrogensulfate, 1-ethyl-3-methylimidazolium hydrogensulfate, 1-methylimidazolium hydrogensulfate, 1-butyl-4-methylpyridinium hydrogensulfate, 1-butylpyridinium hydrogensulfate, 1-ethylpyridinium hydrogensulfate, 1-methylpyridinium hydrogensulfate, guanidinium hydrogensulfate, hexamethylguanidinium hydrogensulfate, methyltrioctylammonium hydrogensulfate, tributylmethylammonium hydrogensulfate, 1,2,3-trimethylimidazolium methylsulfonate, 1,2-dimethylimidazolium methylsulfonate, 1,3-dimethylimidazolium methylsulfonate, 1-butyl-2-methylimidazolium methylsulfonate, 1-butyl-3-ethylimidazolium methylsulfonate, 1-butyl-3-methylimidazolium methylsulfonate, 1-butylimidazolium methylsulfonate, 1-ethyl-3-methylimidazolium methylsulfonate, 1-methylimidazolium methylsulfonate, 1-butyl-4-methylpyridinium methylsulfonate, 1-butylpyridinium methylsulfonate, 1-ethylpyridinium methylsulfonate, 1-methylpyridinium methylsulfonate, guanidinium methylsulfonate, hexamethylguanidinium methylsulfonate, methyltrioctylammonium methylsulfonate, tributylmethylammonium methylsulfonate, 1,2,3-trimethylimidazolium tosylate, 1,2-dimethylimidazolium tosylate, 1,3-dimethylimidazolium tosylate, 1-butyl-2-methylimidazolium tosylate, 1-butyl-3-ethylimidazolium tosylate, 1-butyl-3-methylimidazolium tosylate, 1-butylimidazolium tosylate, 1-ethyl-3-methylimidazolium tosylate, 1-methylimidazolium tosylate, 1-butyl-4-methylpyridinium tosylate, 1-butylpyridinium tosylate, 1-ethylpyridinium tosylate, 1-methylpyridinium tosylate, guanidinium tosylate, hexamethylguanidinium tosylate, methyltrioctylammonium tosylate, tributylmethylammonium tosylate, 1,2,3-trimethylimidazolium trifluoromethylsulfonate, 1,2-dimethylimidazolium trifluoromethylsulfonate, 1,3-dimethylimidazolium trifluoromethylsulfonate, 1-butyl-2-methylimidazolium trifluoromethylsulfonate, 1-butyl-3-ethylimidazolium trifluoromethylsulfonate, 1-butyl-3-methylimidazolium trifluoromethylsulfonate, 1-butylimidazolium trifluoromethylsulfonate, 1-ethyl-3-methylimidazolium trifluoromethylsulfonate, 1-methylimidazolium trifluoromethylsulfonate, 1-butyl-4-methylpyridinium trifluoromethylsulfonate, 1-butylpyridinium trifluoromethylsulfonate, 1-ethylpyridinium trifluoromethylsulfonate, 1-methylpyridinium trifluoromethylsulfonate, guanidinium trifluoromethylsulfonate, hexamethylguanidinium trifluoromethylsulfonate, methyltrioctylammonium trifluoromethylsulfonate and tributylmethylammonium trifluoromethylsulfonate.

The ionic liquids are particularly preferably selected from the group consisting of 1,3-dimethylimidazolium chloride, 1-butyl-3-methylimidazolium chloride, 1-butyl-4-methylpyridinium chloride, 1-butylpyridinium chloride, 1-ethyl-3-methylimidazolium chloride, 1-methylimidazolium chloride, 1-methylpyridinium chloride, 1,3-dimethylimidazolium hydrogensulfate, 1-butyl-3-methylimidazolium hydrogensulfate, 1-butyl-4-methylpyridinium hydrogensulfate, 1-butylpyridinium hydrogensulfate, 1-ethyl-3-methylimidazolium hydrogensulfate, 1-methylimidazolium hydrogensulfate, 1-methylpyridinium hydrogensulfate, 1,3-dimethylimidazolium methylsulfonate, 1-butyl-3-methylimidazolium methylsulfonate, 1-butyl-4-methylpyridinium methylsulfonate, 1-butylpyridinium methylsulfonate, 1-ethyl-3-methylimidazolium methylsulfonate, 1-methylimidazolium methylsulfonate, 1-methylpyridinium methylsulfonate, 1,3-dimethylimidazolium tosylate, 1-butyl-3-methylimidazolium tosylate, 1-butyl-4-methylpyridinium tosylate, 1-butylpyridinium tosylate, 1-ethyl-3-methylimidazolium tosylate, 1-methylimidazolium tosylate and 1-methylpyridinium tosylate.

In particular, the ionic liquids are selected from the group consisting of 1-butyl-3-methylimidazolium chloride, 1-butyl-4-methylpyridinium chloride, 1-butylpyridinium chloride, 1-ethyl-3-methylimidazolium chloride, 1-methylimidazolium chloride, 1-butyl-3-methylimidazolium hydrogensulfate, 1-butyl-4-methylpyridinium hydrogensulfate, 1-butylpyridinium hydrogensulfate, 1-ethyl-3-methylimidazolium hydrogensulfate, 1-methylimidazolium hydrogensulfate, 1-butyl-3-methylimidazolium methylsulfonate, 1-butyl-4-methylpyridinium methylsulfonate, 1-butylpyridinium methylsulfonate, 1-ethyl-3-methylimidazolium methylsulfonate and 1-methylimidazolium methylsulfonate.

The preferred ionic liquid is EMIM (1-ethyl-3-methylimidazolium chloride).

The temperature range of the process in the scrubbing stage is preferably from −35° C. to 300° C., particularly preferably from −20 to 150° C., in particular from 60 to 100° C. In any case, the process in the scrubbing stage is carried out above the solidification point of the polar scrubbing medium.

The pressure in the process is usually from 0.2 to 20 bar, preferably from 0.5 to 16 bar, particularly preferably from 1 to 14 bar. In a preferred embodiment, the pressure in the scrubbing stage is equal to or less than the pressure of the hydrogen chloride/phosgene mixture to be processed. In a further, preferred embodiment, the pressure of the stripping stage is equal to or higher than the pressure of the subsequent stage which processes the gas which has been driven off.

In one preferred embodiment, the solvent stream taken from the scrubbing stage is conveyed through a pump and a heat exchanger and heated. In a further preferred embodiment, the solvent stream leaving the stripping stage is conveyed through a pump and through a heat exchanger and cooled. In a particularly preferred embodiment, these two heat exchangers can be coupled in a thermal circuit or can be identical.

The feed mixtures which are usually to be fractionated by means of the process have a molar ratio of hydrogen chloride to phosgene of from 1:1000 to 1:0.001, preferably from 1:100 to 1:0.01, particularly preferably from 1:20 to 1:0.05. The feed mixtures can be gaseous, liquid or in the form of a gas/liquid mixture. Preference is given to using gaseous mixtures in the process.

The hydrogen chloride/phosgene mixture fed to the process can further comprise relatively large amounts of one or more additional gases or/and one or more further solvents such as monochlorobenzene or dichlorobenzene which are immiscible or only partially miscible on a molecular level with the ionic liquid. If this is the case, the additional solvents can, in a preferred embodiment, be separated off as second liquid phase in the scrubbing stage or in the stripping stage.

FIG. 1 shows one embodiment of the process of the invention. The hydrogen chloride/phosgene mixture is introduced into a column (1) between the bottom and the top or directly into the bottom, preferably between the bottom and top. At the top of the column, the ionic liquid is introduced. In the evaporator (2), the gases dissolved in the ionic liquid are partly driven off again.

Part of the liquid phase is taken off from the introduction tray, cooled by means of a heat exchanger (3) and fed back into the column above the introduction tray or on the introduction tray itself, preferably above the introduction tray. A stream comprising the scrubbing medium is taken off at the bottom of the column.

The stream taken off at the bottom of the column (1) is fed into an evaporator (4). This can have one or more evaporation stages in which different pressure levels can prevail. In this evaporator stage, the hydrogen chloride is driven off from the solvent.

The scrubbing medium stream is cooled in a heat exchanger (5) before it is introduced into the column for carrying out the scrubbing step.

The hydrogen chloride obtained can, if it is appropriately clean, be used, for example, in the food industry or in the electronics industry. A further use of the hydrogen chloride is in oxychlorination, for example in the EDC process for preparing 1,2-dichloroethane. Hydrogen chloride is often also used for producing chlorine in an electrolysis process or in a Deacon process. Particularly in the EDC process and the electrolysis process, it is important that the hydrogen chloride contains only a very limited proportion of organic impurities.

The hydrogen chloride obtained and the phosgene obtained are each recovered in a purity of at least 80%, preferably at least 95%, particularly preferably at least 99.9% and very particularly preferably at least 99.99%. All figures are % by mass.

The hydrogen chloride obtained and the phosgene obtained are obtained in gaseous form. The phosgene can be condensed in a heat exchanger in a subsequent stage for the purposes of further processing.

The phosgene obtained can be reused in an upstream process such as isocyanate, acid chloride and polycarbonate production.

EXAMPLE

Figure 2:
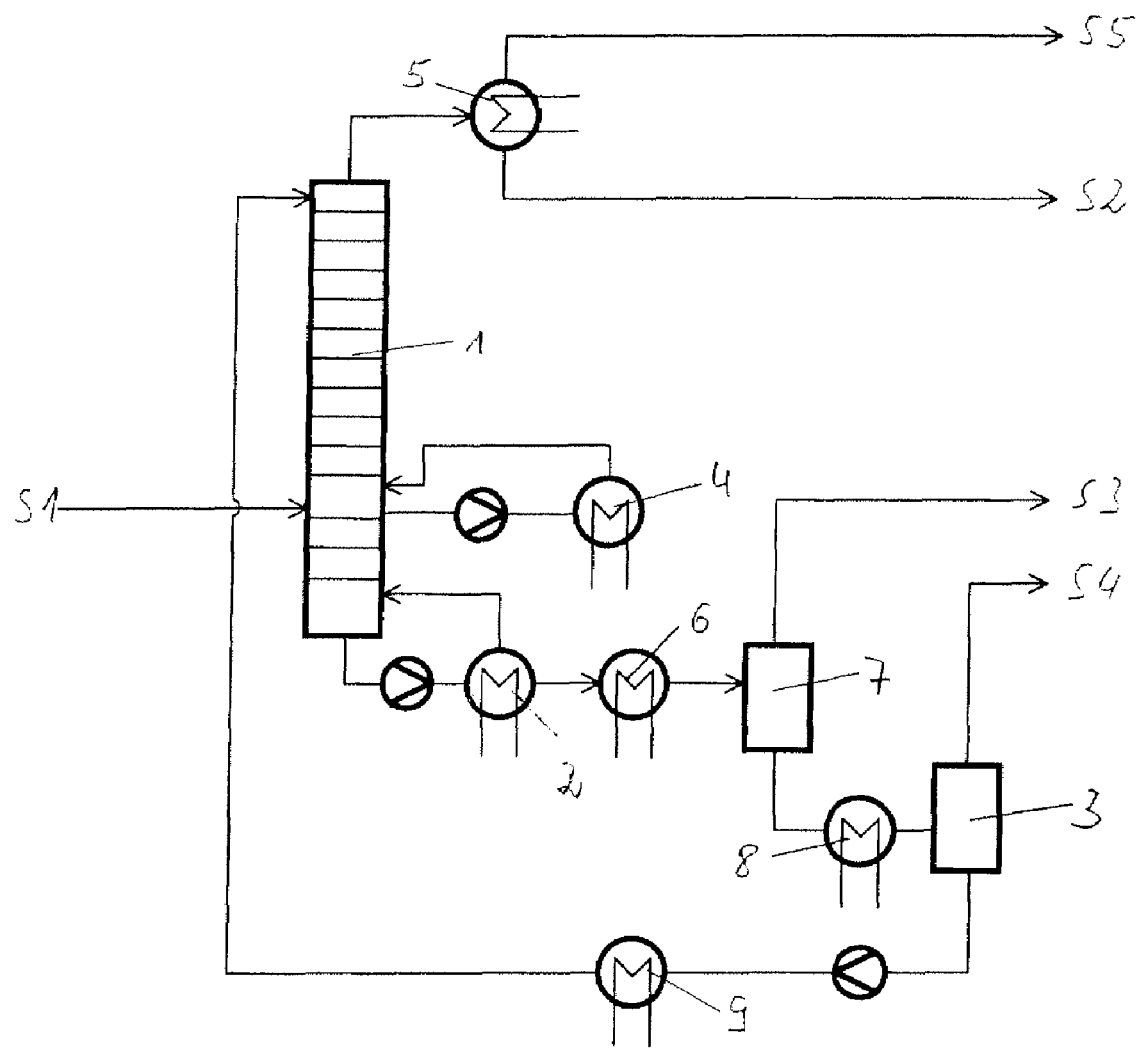

The apparatus described in FIG. 2 was used.

100 kg/h of a gas mixture (S1) having the composition 85% by weight of phosgene and 15% by mass of hydrogen chloride were fed at 37° C. into the tray column (1) having 13 trays and a forced circulation evaporator (2) at the bottom. At the top of the column, 51.6 kg/h of ethylmethylimidazolium chloride (EMIM chloride) recirculated from the second hydrogen chloride stripping stage (3) were introduced as scrubbing liquid at a temperature of 40° C. Part of the ionic liquid passing through the column was taken off at the level of the gas inlet tray, subjected to intermediate cooling to 40° C. in the heat exchanger (4) and returned to the column. The gas which had largely been freed of hydrogen chloride left the column at the top and was condensed at 40° C. and about 3.9 bar in the heat exchanger (5). 85.4 kg/h of liquid phosgene (S2) having a purity of 99.5% by mass were obtained. The gas (S5) remaining after condensation of the phosgene was discharged. The scrubbing medium stream enriched in hydrogen chloride left the bottom of the column and was heated to 250° C. by means of the heat exchanger (6). The resulting gas phase of 12.1 kg/h of hydrogen chloride having a purity of 99.99% by mass (S3) was separated from the ionic liquid at 4.2 bar in a gas-liquid phase separator (7). In a second step, a further 2.4 kg/h of hydrogen chloride gas (S4) were driven off in the vessel (3) at 1.3 bar after introduction of heat of vaporization via the heat exchanger (8). The scrubbing liquid was cooled to 40° C. in the heat exchanger (9) and returned to the column.

The invention claimed is:

1. A process for separating hydrogen chloride and phosgene, which comprises bringing a mixture of hydrogen chloride and phosgene into contact with an ionic liquid in which at least part of the hydrogen chloride is dissolved in a step a) and then separating off the hydrogen chloride dissolved in the ionic liquid in a step b).

2. The process according to claim 1, wherein the ionic liquids are compounds comprising a cation and an anion, and at least one of the ions is an organic ion.

3. The process according to claim 1, wherein the cation is selected from the group consisting of 1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimidazolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2,3-dimethylimidazolium, 1-tetradecyl-3-methylimidazolium, 2,3-dimethylimidazolium, 2-ethyl-3,4-dimethylimidazolium, 3,4-dimethylimidazolium, 1,2-dimethylpyridinium, 1-butyl-2-ethyl-6-methylpyridinium, 1-butyl-2-ethylpyridinium, 1-butyl-2-methylpyridinium, 1-butyl-3,4-dimethylpyridinium, 1-butyl-3,5-dimethylpyridinium, 1-butyl-3-ethylpyridinium, 1-butyl-3-methylpyridinium, 1-butyl-4-methylpyridinium, 1-butylpyridinium, 1-ethylpyridinium, 1-hexyl-3-methylpyridinium, 1-hexyl-4-methylpyridinium, 1-hexylpyridinium, 1-methylpyridinium, 1-octylpyridinium, 2-ethyl-1,6-dimethylpyridinium, 2-ethyl-1-methylpyridinium, 4-methyl-1-octylpyridinium, 1,1-dimethylpyrrolidinium, 1-butyl-1-ethylpyrrolidinium, 1-butyl-1-methylpyrrolidinium, 1-ethyl-1-methylpyrrolidinium, 1-ethyl-3-methylpyrrolidinium, 1-hexyl-1-methylpyrrolidinium, 1-octyl-1-methylpyrrolidinium, guanidinium, hexamethylguanidinium, N,N,N',N'-tetramethyl-N''-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium, triisobutyl(methyl)phosphonium, butyltrimethylammonium, methyltrioctylammonium, octyltrimethylammonium, tetrabutylammonium, tetraethylammonium, tetramethylammonium, tributylmethylammonium and guanidinium ions of the general formula (I)

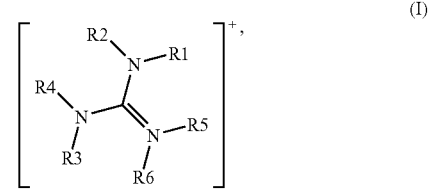

(I)

where the radicals R1 to R6 are each, independently of one another, hydrogen, C1-C18-alkyl, C2-C18-alkyl which may be interrupted by one or more oxygen and/or sulfur atoms and/or one or more substituted or unsubstituted imino groups, C6-C12-aryl, C5-C12-cycloalkyl or a five- or six-membered, oxygen-, nitrogen- and/or sulfur-containing heterocycle or two of them can together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

4. The process according to claim 1, wherein the cation is selected from the group consisting of 1,2,3-trimethylimidazolium, 1,2-dimethylimidazolium, 1,3,4-trimethylimidazolium, 1,3-dibutylimidazolium, 1,3-diethylimidazolium, 1,3-dimethylimidazolium, 1-butyl-2,3-dimethylimidazolium, 1-butyl-2-methylimidazolium, 1-butyl-3-ethylimidazolium, 1-butyl-3-methylimidazolium, 1-butylimidazolium, 1-ethyl-2,3-dimethylimidazolium, 1-ethyl-3-methylimidazolium, 1-hexyl-3-methylimidazolium, 1-methyl-2-ethylimidazolium, 1-methyl-3-octylimidazolium, 1-methylimidazolium, 1,2-dimethylpyridinium, 1-butyl-2-methylpyridinium, 1-butyl-3-ethylpyridinium, 1-butyl-3-methylpyridinium, 1-butyl-4-methylpyridinium, 1-butylpyridinium, 1-ethylpyridinium, 1-hexylpyridinium, 1-methylpyridinium, 2-ethyl-1-methylpyridinium, 1,1-dimethylpyrrolidinium, 1-butyl-1-ethylpyrrolidinium, 1-butyl-1-methylpyrrolidinium, 1-ethyl-1-methylpyrrolidinium, guanidinium, hexamethylguanidinium, benzyltriphenylphosphonium, tetrabutylphosphonium, butyltrimethylammonium, methyltrioctylammonium, tetrabutylammonium, tributylmethylammonium.

5. The process according to claim 1, wherein the cation is selected from the group consisting of 1,2,3-trimethylimidazolium, 1,2-dimethylimidazolium, 1,3-dimethylimidazolium, 1-butyl-2-methylimidazolium, 1-butyl-3-ethylimidazolium, 1-butyl-3-methylimidazolium, 1-butylimidazolium, 1-ethyl-3-methylimidazolium, 1-methylimidazolium, 1-butyl-4-methylpyridinium, 1-butylpyridinium, 1-ethylpyridinium, 1-methylpyridinium, guanidinium, hexamethylguanidinium, methyltrioctylammonium and tributylmethylammonium.

6. The process according to claim 1, wherein the anion is selected from the group consisting of acetate, bis(2,4,4-trimethylpentyl)phosphinate, bis(malonato)borate, bis(oxalato)borate, bis(pentafluoroethyl)phosphinate, bis(phthalato)borate, bis(salicylato)borate, bis(trifluoromethanesulfonyl)imidate, bis(trifluoromethanesulfonyl)methane, bis(trifluoromethyl)imidate, bromide, bromoaluminates, carbonate, chloride, chloroaluminates, dichlorocuprate, dicyanamide, diethylphosphate, dihydrogenphosphate, ethylsulfate, ethylsulfonate, fluoride, hexafluorophosphate, hydrogencarbonate, hydrogenphosphate, hydrogensulfate, hydrogensulfite, iodide, methylsulfate, methylsulfonate, nitrate, nitrite, phosphate, sulfate, sulfite, tetracyanoborate, tetrafluoroborate, tetrakis(hsulfato)borate, tetrakis(methylsulfonato)borate, thiocyanate, tosylate, trichlorozincate, trifluoroacetate, trifluoromethylsulfonate, tris(heptafluoropropyl)trifluorophosphate, tris(nonafluorobutyl)trifluorophosphate, tris(pentafluoroethyl)trifluorophosphate and tris(pentafluoroethylsulfonyl)trifluorophosphate.

7. The process according to claim 1, wherein the anion is selected from the group consisting of acetate, bis(trifluoromethanesulfonyl)imidate, bis(trifluoromethanesulfonyl)methane, bis(trifluoromethyl)imidate, bromide, chloride, ethylsulfonate, hexafluorophosphate, hydrogenphosphate, hydrogensulfate, methylsulfonate, sulfate, tetrafluoroborate, tetrakis(hydrogensulfato)borate, thiocyanate, tosylate, trifluoroacetate and trifluoromethylsulfonate.

8. The process according to claim 1, wherein the anion is selected from the group consisting of bis(trifluoromethanesulfonyl)imidate, chloride, hydrogensulfate, methylsulfonate, tosylate and trifluoromethylsulfonate.

9. The process according to claim 1, wherein the anion is chloride.

10. The process according to claim 1, wherein the ionic liquid is selected from the group consisting of 1,3-dimethylimidazolium chloride, 1-butyl-3-methylimidazolium chloride, 1-butyl-4-methylpyridinium chloride, 1-butylpyridinium chloride, 1-ethyl-3-methylimidazolium chloride, 1-methylimidazolium chloride, 1-methylpyridinium chloride, 1,3-dimethylimidazolium hydrogensulfate, 1-butyl-3-methylimidazolium hydrogensulfate, 1-butyl-4-methylpyridinium hydrogensulfate, 1-butylpyridinium hydrogensulfate, 1-ethyl-3-methylimidazolium hydrogensulfate, 1-methylimidazolium hydrogensulfate, 1-methylpyridinium hydrogensulfate, 1,3-dimethylimidazolium methylsulfonate, 1-butyl-3-methylimidazolium methylsulfonate, 1-butyl-4-methylpyridinium methylsulfonate, 1-butylpyridinium methylsulfonate, 1-ethyl-3-methylimidazolium methylsulfonate, 1-methylimidazolium methylsulfonate, 1-methylpyridinium methylsulfonate, 1,3-dimethylimidazolium tosylate, 1-butyl-3-methylimidazolium tosylate, 1-butyl-4-methylpyridinium tosylate, 1-butylpyridinium tosylate, 1-ethyl-3-methylimidazolium tosylate, 1-methylimidazolium tosylate and 1-methylpyridinium tosylate.

11. The process according to claim 1, wherein the ionic liquid is selected from the group consisting of 1-butyl-3-methylimidazolium chloride, 1-butyl-4-methylpyridinium chloride, 1-butylpyridinium chloride, 1-ethyl-3-methylimidazolium chloride, 1-methylimidazolium chloride, 1-butyl-3-methylimidazolium hydrogensulfate, 1-butyl-4-methylpyridinium hydrogensulfate, 1-butylpyridinium hydrogensulfate, 1-ethyl-3-methylimidazolium hydrogensulfate, 1-methylimidazolium hydrogensulfate, 1-butyl-3-methylimidazolium methylsulfonate, 1-butyl-4-methylpyridinium methylsulfonate, 1-butylpyridinium methylsulfonate, 1-ethyl-3-methylimidazolium methylsulfonate and 1-methylimidazolium methylsulfonate.

12. The process according to claim 1, wherein the ionic liquid is 1-ethyl-3-methylimidazolium chloride.

13. The process according to claim 1, wherein step a) is carried out in a vessel, a pump circuit comprising at least a pump and a gas inlet nozzle, a surface absorber, a falling film absorber, a column, a bubble column, a stirred vessel with gas inlets, a spray column or a jet nozzle scrubber.

14. The process according to claim 1, wherein step a) is carried out in a column.

15. The process according to claim 1, wherein step b) is carried out in a falling film evaporator, a helical tube, a thin film evaporator, a natural convection evaporator with external or internal circulation, a column with internals which may be heated, a forced circulation depressurization evaporator or a falling film evaporator.

16. The process according to claim 1, wherein the ionic liquids are compounds comprising a cation and an anion, and the cation is an organic ion.

17. The process according to claim 1, further comprising:
recovering the phosgene after the mixture of hydrogen chloride and phosgene is contacted with the ionic liquid.

18. The process according to claim 1, wherein the ionic liquid is a liquid at a temperature of less than 100° C.

19. The process according to claim 1, wherein the ionic liquid is a liquid at a temperature of 50° C. or less.

* * * * *